(No Model.) 2 Sheets—Sheet 1.
T. L. McKEEN.
LOCOMOTIVE COUPLING.
No. 464,381. Patented Dec. 1, 1891.
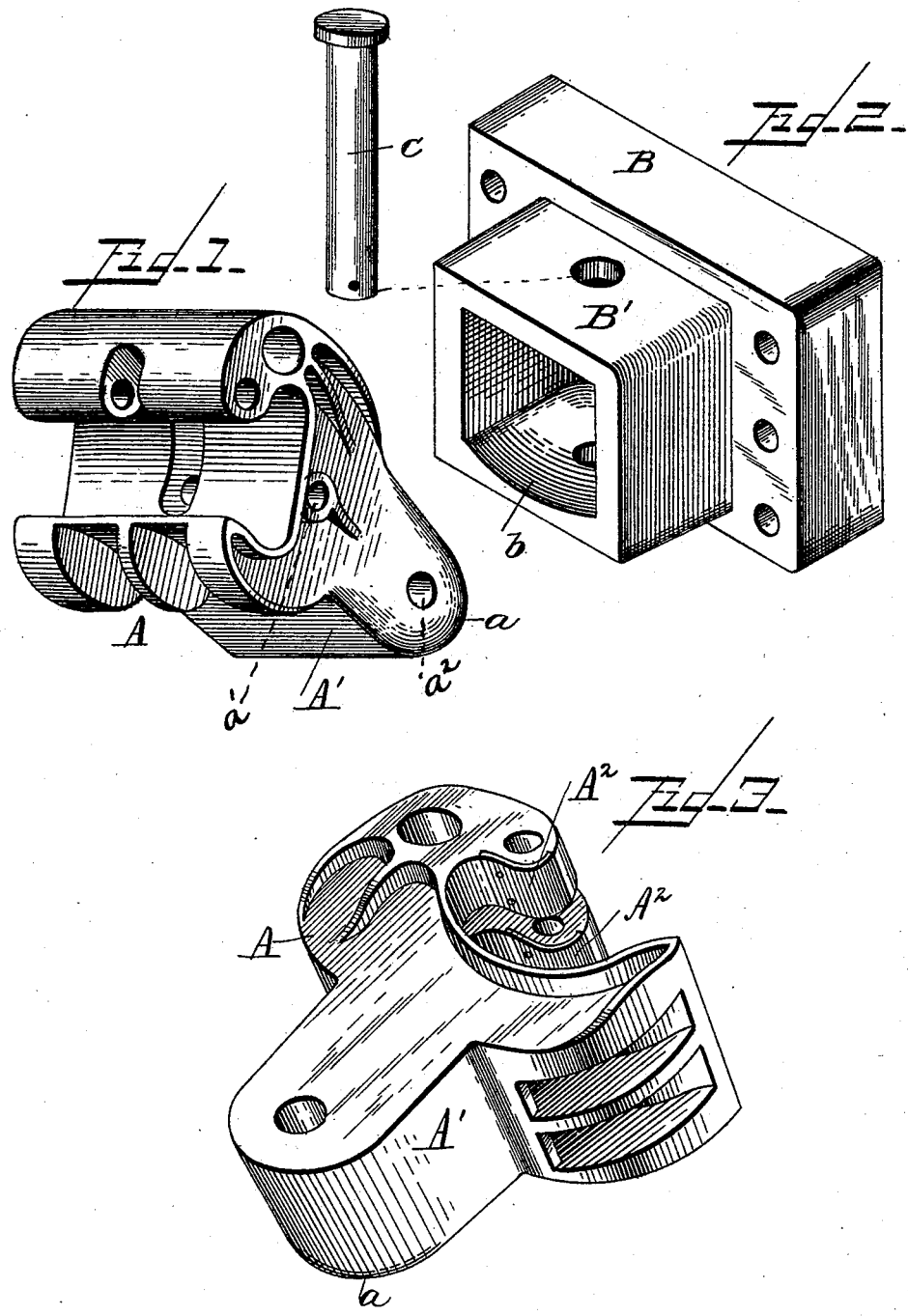
WITNESSES
F. L. Ourand.
J. C. Wilson.
INVENTOR
Thomas L. McKeen
by Whitman & Wilkinson
Attorneys

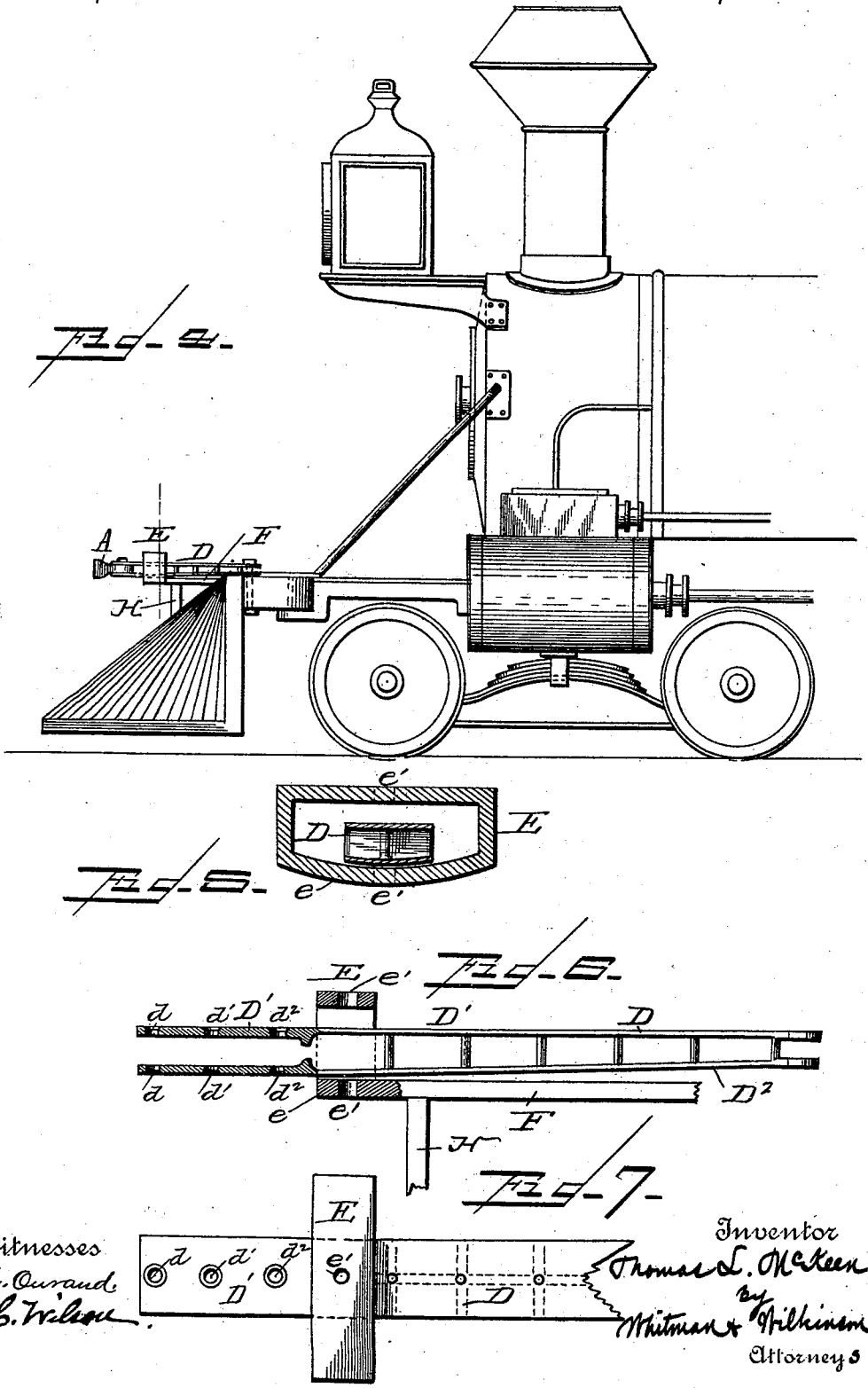

UNITED STATES PATENT OFFICE.

THOMAS L. McKEEN, OF NEW YORK, N. Y., ASSIGNOR TO THE THURMOND CAR COUPLING COMPANY, OF WEST VIRGINIA.

LOCOMOTIVE-COUPLING.

SPECIFICATION forming part of Letters Patent No. 464,381, dated December 1, 1891.

Application filed July 13, 1891. Serial No. 399,304. (No model.)

*To all whom it may concern:*

Be it known that I, THOMAS L. McKEEN, a citizen of the United States, residing at New York, in the county of New York and State of New York, have invented certain new and useful Improvements in Locomotive-Couplings; and I do hereby declare the following to be a full, clear, and exact description of the invention, such as will enable others skilled in the art to which it appertains to make and use the same.

My invention relates to tender-hooks for locomotives, and is especially applicable to switch-engines used in freight-yards, car-shops, &c.

It consists in certain improvements upon the tender-hook described in my patent, No. 447,579, granted March 3, 1891, and of certain other novel features hereinafter described and claimed.

Reference is had to the accompanying drawings, wherein the same parts are indicated by the same letters.

Figure 1 represents a perspective view of the tender-hook, made, preferably, of malleable iron or cast-steel. Fig. 2 represents the face-plate, the pin for connecting the shank of the tender-hook thereto being shown detached and to the left. Fig. 3 represents a perspective view of a modification of the tender-hook shown in Fig. 1, the difference lying in the detachable re-enforce plate attached to the interior face of the hook, where the wear is greatest. Fig. 4 represents an engine fitted with my automatically-centered coupler over the cow-catcher. Fig. 5 represents a cross-section of the carrying-iron used in Fig. 4. Fig. 6 represents a side view, partly in section, of the shank connecting the coupler to the locomotive. Fig. 7 represents a plan view of the shank shown in Fig. 6.

In the device shown on Sheet I, A represents the tender-hook, having the shank $A'$, rounded at the bottom, to register with the groove $b$ in the socket $B'$ of the face-plate B. This groove $b$ and the corresponding projection $a$ should, preferably, be about three-eighths of an inch in depth; but the depth may be varied to suit varying conditions. The shank $A'$ must also have a similar vertical play in the socket $B'$.

In the device shown on Sheet II of the drawings the hook is secured to a long shank D, which rests in a carrying-iron E, supported on beam F and stanchion H above the cow-catcher. This carrying-iron E may either be integral with or attached to the said beam. This carrying-iron is considerably wider than the shank D and has its lower wall $e$ sloping from each side toward the center, as shown in Fig. 5. The carrying-iron E is provided with vertical holes $e'$ for using a pin with a long link should the shank D be removed or be broken off inside of the said carrying-iron, while the said shank D has also holes $d$, $d'$, and $d^2$ for use in link-and-pin couplings should the hook A be removed. The two outermost of these holes are also used in securing the said hook to the end of the said shank D, the pin being passed through the holes $a'$ and $a^2$, Fig. 1, and the holes $d'$ and $d^2$, Fig. 6. In this case the carrying-iron E and shank D shown in Sheet II of the drawings correspond to the face-plate B and shank $A'$ shown on Sheet I.

With tender-hooks now in use in coupling on and in uncoupling on sharp curves, which are specially common in freight-yards, car-shops, &c., the switch-engine is frequently uncoupled on a curve, when the tender-hook will remain at an angle to the longitudinal axis of the car. Should the train hands neglect to push over the tender-hook by hand, and an effort be made to couple on to a car having its coupler inclined in the opposite direction, the two draw-bars will crash into each other and will not only refuse to couple, but may cause considerable damage to the couplers; but by having the groove $b$ in the lower wall of the socket $B'$ or the sloping base $e$ in the carrying-iron E when the tender-hook is released while trending to either side the shank $A'$ or D will tend to slip back into a median position, and if the slope of $b$ or of $e$ be sufficiently steep it will invariably do so whenever any extraneous forces, tending to keep it out of the median line, are withdrawn. It is not necessary to have the slope of $b$ or $e$ very steep, as the weight of the heavy hook will cause the shank to slip down as low as possible, and any tendency to stick will be largely met by the jarring of the switch-engine in moving about the track.

Since the solid tender-hook is quite expensive and the maximum wear is on the interior of the hook, which part is necessarily thin to engage the twin-jaw couplers of the standard type, I provide detachable plates $A^2$, made of wrought-iron or steel, which may be removed when worn out and others added.

Having thus described my invention, what I claim, and desire to secure by Letters Patent of the United States, is—

1. In a car-coupling, the combination, with a coupling-hook and a shank integral with or connected thereto, of a support for the said shank, having two interior inclined surfaces forming a groove in the said support with the lowest portion of the said groove approximately in the direction of the axis of the car, as and for the purposes described.

2. In a car-coupling, the combination, with a face-plate secured to one of the cars, said face-plate having a socket with a groove in the center of the lower wall thereof, of a tender-hook having a shank fitting in said socket and adapted to slide into the center of said groove, substantially as and for the purposes described.

3. In a car-coupling, the combination, with a face-plate B, having a socket B' therein, with a groove $b$ in the lower wall of said socket, of a tender-hook A, having shank A', curved at $a$, substantially as and for the purposes described.

In testimony whereof I affix my signature in presence of two witnesses.

THOMAS L. McKEEN.

Witnesses:
T. W. GETMAN,
M. C. HASCALL.